United States Patent
Gauthier et al.

(10) Patent No.: US 9,081,466 B2
(45) Date of Patent: Jul. 14, 2015

(54) DYNAMIC CHART CONTROL THAT TRIGGERS DYNAMIC CONTEXTUAL ACTIONS

(75) Inventors: Alain Gauthier, Montreal (CA); Mohannad El-Jayousi, L'Ile-Bizard (CA); Roy Ghorayeb, Montreal (CA); Vincent Lavoie, Montreal (CA); Xuebo Liang, Brossard (CA); Rolan Abdukalykov, Montreal (CA)

(73) Assignee: SAP SE, Walldorf (DE)

( * ) Notice: Subject to any disclaimer, the term of this patent is extended or adjusted under 35 U.S.C. 154(b) by 56 days.

(21) Appl. No.: 13/608,756

(22) Filed: Sep. 10, 2012

(65) Prior Publication Data

US 2014/0075390 A1     Mar. 13, 2014

(51) Int. Cl.
G06F 3/048     (2013.01)
G06F 3/0484    (2013.01)

(52) U.S. Cl.
CPC .............. *G06F 3/048* (2013.01); *G06F 3/0484* (2013.01); *G06F 3/04842* (2013.01)

(58) Field of Classification Search
USPC ................................................. 715/700–866
See application file for complete search history.

(56) References Cited

U.S. PATENT DOCUMENTS

| 5,745,110 | A |   | 4/1998 | Ertemalp |
|---|---|---|---|---|
| 5,867,163 | A |   | 2/1999 | Kurtenbach |
| 5,898,431 | A | * | 4/1999 | Webster et al. ............... 715/841 |
| 6,054,989 | A |   | 4/2000 | Robertson et al. |
| 6,201,554 | B1 |   | 3/2001 | Lands |
| 6,380,953 | B1 |   | 4/2002 | Mizuno |
| 6,674,450 | B1 |   | 1/2004 | Toub et al. |
| 6,915,490 | B1 |   | 7/2005 | Ewing |
| 7,050,056 | B2 |   | 5/2006 | Meyringer |
| 7,168,045 | B2 |   | 1/2007 | Fliess et al. |
| 7,340,484 | B2 |   | 3/2008 | S et al. |

(Continued)

FOREIGN PATENT DOCUMENTS

| AU | 2011101579 A4 | 2/2012 |
|---|---|---|
| EP | 1696301 A1 | 8/2006 |

(Continued)

OTHER PUBLICATIONS

Arsanjani, Ali. "Rule Object 2001: A Pattern Language for Adaptive and Scalable Business Rule Construction". IBM National EAD Center of Competency [online], [retrieved on May 16, 2014]. Retrieved from the Internet (URL:http://citeseerx.ist.psu.edu/viewdoc/download?doi=10.1.1.202.6970&rep=repl&type=pdf), 2001.*

(Continued)

*Primary Examiner* — Matt Kim
*Assistant Examiner* — Daniel Samwel
(74) *Attorney, Agent, or Firm* — Kenyon & Kenyon LLP (57) ABSTRACT

A system and method are described herein that provide for dynamically controlling a chart visualized in a user interface by turning business objects visualized in the chart into clickable action buttons to trigger corresponding business actions. Business objects are retrieved from a backend server and displayed as visual representations in a chart rendered in a calendar application user interface. A user clicking or tapping a visual representation in the chart triggers a corresponding predefined action that has been customized in the connected system or backend server and is dynamically assigned to the chart control based on the business context of the calendar application.

19 Claims, 6 Drawing Sheets

(56) References Cited

U.S. PATENT DOCUMENTS

| | | | |
|---|---|---|---|
| 7,421,645 B2 * | 9/2008 | Reynar | 715/206 |
| 7,546,577 B2 | 6/2009 | Do et al. | |
| 7,603,381 B2 * | 10/2009 | Burke et al. | 705/7.12 |
| 7,739,695 B2 * | 6/2010 | Wood et al. | 719/328 |
| 7,908,584 B2 | 3/2011 | Singh et al. | |
| 8,024,666 B2 | 9/2011 | Thompson | |
| 8,191,003 B2 | 5/2012 | Brown et al. | |
| 8,214,748 B2 | 7/2012 | Srikanth et al. | |
| 8,402,480 B2 | 3/2013 | Rohwer | |
| 8,788,303 B1 | 7/2014 | Krone et al. | |
| 8,812,546 B1 | 8/2014 | Cornali | |
| 2002/0091586 A1 | 7/2002 | Wakai et al. | |
| 2003/0066032 A1 * | 4/2003 | Ramachandran et al. | 715/513 |
| 2003/0120621 A1 | 6/2003 | McDaniel et al. | |
| 2003/0160815 A1 | 8/2003 | Muschetto | |
| 2003/0182210 A1 | 9/2003 | Weitzman et al. | |
| 2003/0229848 A1 | 12/2003 | Arend et al. | |
| 2004/0252134 A1 | 12/2004 | Bhatt et al. | |
| 2005/0144038 A1 | 6/2005 | Tamblyn et al. | |
| 2005/0171410 A1 | 8/2005 | Hjelt et al. | |
| 2005/0197998 A1 | 9/2005 | Asbury | |
| 2005/0278217 A1 | 12/2005 | Adams et al. | |
| 2005/0278372 A1 | 12/2005 | Shaburov et al. | |
| 2005/0289202 A1 | 12/2005 | S et al. | |
| 2006/0069666 A1 | 3/2006 | Burke et al. | |
| 2006/0089877 A1 | 4/2006 | Graziano et al. | |
| 2006/0206522 A1 | 9/2006 | Austin et al. | |
| 2006/0238538 A1 | 10/2006 | Kapler et al. | |
| 2007/0064022 A1 | 3/2007 | Silverbrook et al. | |
| 2007/0156430 A1 | 7/2007 | Kaetker et al. | |
| 2007/0199006 A1 | 8/2007 | Mukundan et al. | |
| 2007/0211056 A1 | 9/2007 | Chakraborty et al. | |
| 2007/0219842 A1 | 9/2007 | Bansal et al. | |
| 2007/0233539 A1 | 10/2007 | Suenderhauf et al. | |
| 2007/0244875 A1 | 10/2007 | Bodin et al. | |
| 2007/0268246 A1 | 11/2007 | Hyatt | |
| 2007/0288283 A1 | 12/2007 | Fitzpatrick | |
| 2008/0040684 A1 | 2/2008 | Crump | |
| 2008/0114625 A1 | 5/2008 | Kline et al. | |
| 2008/0120129 A1 | 5/2008 | Seubert et al. | |
| 2008/0141142 A1 | 6/2008 | Lyle et al. | |
| 2008/0163125 A1 | 7/2008 | Gu et al. | |
| 2008/0178101 A1 | 7/2008 | Rode et al. | |
| 2008/0178500 A1 | 7/2008 | Teuteberg | |
| 2008/0195969 A1 | 8/2008 | Brown et al. | |
| 2008/0221946 A1 | 9/2008 | Balon | |
| 2008/0294994 A1 | 11/2008 | Kruger et al. | |
| 2008/0307323 A1 | 12/2008 | Coffman et al. | |
| 2008/0313005 A1 | 12/2008 | Nessland et al. | |
| 2008/0319818 A1 | 12/2008 | Gurdin et al. | |
| 2008/0320558 A1 | 12/2008 | Imanishi et al. | |
| 2009/0076878 A1 * | 3/2009 | Woerner et al. | 705/9 |
| 2009/0158173 A1 | 6/2009 | Palahnuk et al. | |
| 2009/0174680 A1 | 7/2009 | Anzures et al. | |
| 2009/0254597 A1 | 10/2009 | Karoji | |
| 2009/0293074 A1 | 11/2009 | Rohwer | |
| 2010/0030783 A1 | 2/2010 | Ho et al. | |
| 2010/0099462 A1 | 4/2010 | Baek et al. | |
| 2010/0131889 A1 | 5/2010 | Helmolt et al. | |
| 2010/0138334 A1 | 6/2010 | Warsaw et al. | |
| 2010/0145936 A1 | 6/2010 | Grinstein et al. | |
| 2010/0251954 A1 | 10/2010 | Yamada | |
| 2010/0318640 A1 | 12/2010 | Mehta et al. | |
| 2010/0325582 A1 * | 12/2010 | Bansal et al. | 715/810 |
| 2010/0333014 A1 | 12/2010 | Fritzley et al. | |
| 2011/0072394 A1 | 3/2011 | Victor | |
| 2011/0078016 A1 | 3/2011 | Wagenblatt et al. | |
| 2011/0078058 A1 | 3/2011 | Wagenblatt et al. | |
| 2011/0078171 A1 | 3/2011 | Wagenblatt et al. | |
| 2011/0087708 A1 | 4/2011 | Teichmann et al. | |
| 2011/0099500 A1 | 4/2011 | Smith et al. | |
| 2011/0153629 A1 | 6/2011 | Lehmann et al. | |
| 2011/0157005 A1 | 6/2011 | Inoue | |
| 2011/0167369 A1 | 7/2011 | van Os | |
| 2011/0167382 A1 | 7/2011 | van Os | |
| 2011/0179368 A1 | 7/2011 | King et al. | |
| 2011/0269435 A1 | 11/2011 | Dieckman | |
| 2011/0276351 A1 | 11/2011 | Kondo et al. | |
| 2011/0289422 A1 | 11/2011 | Spivack et al. | |
| 2011/0298830 A1 | 12/2011 | Lam | |
| 2012/0011426 A1 | 1/2012 | Yach | |
| 2012/0032877 A1 | 2/2012 | Watkins, Jr. et al. | |
| 2012/0036485 A1 | 2/2012 | Watkins, Jr. et al. | |
| 2012/0079408 A1 | 3/2012 | Rohwer | |
| 2012/0105484 A1 | 5/2012 | Cui | |
| 2012/0117493 A1 | 5/2012 | Gu et al. | |
| 2012/0131496 A1 | 5/2012 | Goossens et al. | |
| 2012/0174013 A1 | 7/2012 | Kraus et al. | |
| 2012/0198369 A1 | 8/2012 | Sorin et al. | |
| 2012/0253869 A1 * | 10/2012 | Ansley | 705/7.12 |
| 2012/0284637 A1 | 11/2012 | Boyer et al. | |
| 2012/0304121 A1 | 11/2012 | Cahill et al. | |
| 2013/0038625 A1 | 2/2013 | Nakajima | |
| 2013/0074003 A1 | 3/2013 | Dolenc | |
| 2013/0085961 A1 | 4/2013 | Naghshin et al. | |
| 2013/0144880 A1 | 6/2013 | Kemmer et al. | |
| 2013/0290340 A1 | 10/2013 | Suermondt et al. | |
| 2013/0321340 A1 | 12/2013 | Seo et al. | |
| 2014/0036639 A1 | 2/2014 | Boni et al. | |
| 2014/0225897 A1 | 8/2014 | Sarrazin et al. | |

FOREIGN PATENT DOCUMENTS

| | | |
|---|---|---|
| EP | 1837736 A2 | 9/2007 |
| EP | 2330470 A1 | 6/2011 |
| JP | 2009050937 A | 3/2009 |

OTHER PUBLICATIONS

Google: "Android 2.3.4 User's Guide," googleusercontent.com, May 20, 2011, Retrieved on Oct. 10, 2013 from the Internet: URL:http://static.googleusercontent.com/external_content/untrusted_dlcp/www.google.com/en//help/hc/pdfs/mobile/AndroidUsersGuide-2.3.4.pdf.

Anonymous: "Google Calendar—Revision as of 16:55, Apr. 17, 2012," Apr. 17, 2012, pp. 1-7, Gustavus Adolphus College, Retrieved from the Internet: URL:https://gustavas.edu/gts/w/index.php?title=Google_Calendar&oldid=24920 [retrieved on Jan. 10, 2014].

"Active Knowledge Modeling—Architect Your Business—12 Different Ways to Model Business Processes," http://activeknowledgemodeling.com/2009/03/31/12-different-ways-to-model-business-processes/, Mar. 31, 2009, 8 pages.

"Layer Container," http://homepage.mac.com/dlemmermann/DLSC/manual/components/layercontainer/layercontainer.html, 2007, 2 pages.

IBM TDB and Torres, R.J. "Zooming on Visual Calendar Data," IPCOM Prior Art Database, http://ip.com/IPCOM/000121803, Sep. 1, 1991, 2 pages.

Burigat et al., "Visualizing references to off-screen content on mobile devices: A comparison of Arrows, Wedge, and Overview + Detail," Interacting With Computers, 2011 Elsevier B.V., pp. 156-166.

SEAVUS Project Viewer 4.1, User Manual, 2009—Section 3.7 (groups) 3.6 (filters).

Office Action, dated Feb. 4, 2015, from EP Application No. 13178606.3 filed Jul. 30, 2013.

* cited by examiner

DYNAMIC CHART CONTROL THAT TRIGGERS DYNAMIC CONTEXTUAL ACTIONS

BACKGROUND INFORMATION

Business software such as enterprise resource planning software implements business processes by modeling business data as business objects with data exchange between the objects. The business data provided via the business objects can be accessed through mechanisms such as graphical user interfaces, forms, and analytical reports. Traditionally, user interfaces providing access to business objects could not efficiently represent business objects with a visual perspective together with the ability to perform custom actions assigned dynamically based on context and user needs.

Existing business software using calendar applications have traditionally used calendar interfaces only as a time marker to display and view entries in the calendar. Calendars that do use interactive Gantt charts have been generally focused on allowing the modification of data on a server end or using separate task bars within a Gantt chart to manipulate data corresponding to tasks stored on a server computer or webpage. These implementations do not provide dynamic control over the Gantt chart itself.

Thus there remains a need in the art for a system and method for dynamically controlling a Gantt chart or other similar chart by turning the chart into a clickable action button to trigger corresponding business actions. There also remains a need in the art for a system and method to dynamically control a Gantt chart based on the business context of a calendar or timeline interface.

SUMMARY

A system and method are described herein that provide for dynamically controlling a chart visualized in a user interface by turning business objects visualized in the chart into clickable action buttons to trigger corresponding dynamic business actions. Business objects may be retrieved from a backend server and displayed as visual representations in a chart displayed in a calendar application in a user interface. A user may click or tap a visual representation in the chart to trigger a corresponding predefined action that has been customized in the connected system or backend server and is dynamically assigned to the chart control based on the business context of the calendar application.

In particular, the exemplary embodiments and/or exemplary methods are directed to a system and method for dynamically controlling business objects in a Gantt chart visualized in a timeline interface in a calendar application. The system and method include retrieving the business objects stored in a backend system and categorizing the business objects into customized categories. The system and method also include assigning customized categories to predefined actions to be performed on the business objects. Each category may have a unique set of assigned actions. The system and method may then display visual representations of the business objects in the Gantt chart on a user interface of the mobile device executing the calendar application.

The visual representations of the business objects may be selectable action buttons. Upon the initiation of a user action on one of the visual representations of the business objects, one of the predefined actions may be triggered based on the previous categorization of the business object of the selected visual representation. Examples of user actions include touching, tapping, pinching, shacking, turning the mobile device, and circling a touch screen of the mobile device displaying the user interface, if the device has a touch screen. In other devices, examples of a user action may include clicking a mouse, clicking a trackball, entering an input in a keypad, entering an input in a keyboard, or through a voice command, etc.

After the user action has been performed, the timeline interface may be modified based on the triggering of the associated predefined action. The predefined actions may be dynamically assigned to a chart control based on a business context of the calendar application, during runtime. The predefined actions may also be assigned to the customized categories during runtime. Different predetermined actions for each category may be triggered based on a performed number of user actions. For example, a different action may be triggered if a user, using a device with a touch screen, taps once on a visual representation of a business object, than if user taps twice on the same visual representation of the business object.

The predefined actions may include, but is not limited to, such actions as, for example, grouping the visual representations of the business objects in the Gantt chart, ungrouping the visual representations of the business objects in the Gantt chart, displaying a detail window for the business object of the selected visual representation, displaying an analytic chart for the business object of the selected visual representation, and setting a status for the business object of the selected visual representation.

DETAILED DESCRIPTION

The subject matter will now be described in detail for specific preferred embodiments, it being understood that these embodiments are intended only as illustrative examples and is not to be limited thereto these embodiments.

Embodiments may discuss systems to dynamically control a chart visualized in a User interface by turning business objects visualized in the chart into clickable action buttons to trigger corresponding business actions. Business objects may be retrieved from a backend server and displayed as visual representations in a chart displayed in a calendar application in a user interface. A user may click or tap a visual representation in the chart to trigger a corresponding predefined action that has been customized in the connected system or backend server and is dynamically assigned to the chart control based on the business context of the calendar application.

Figure 1:
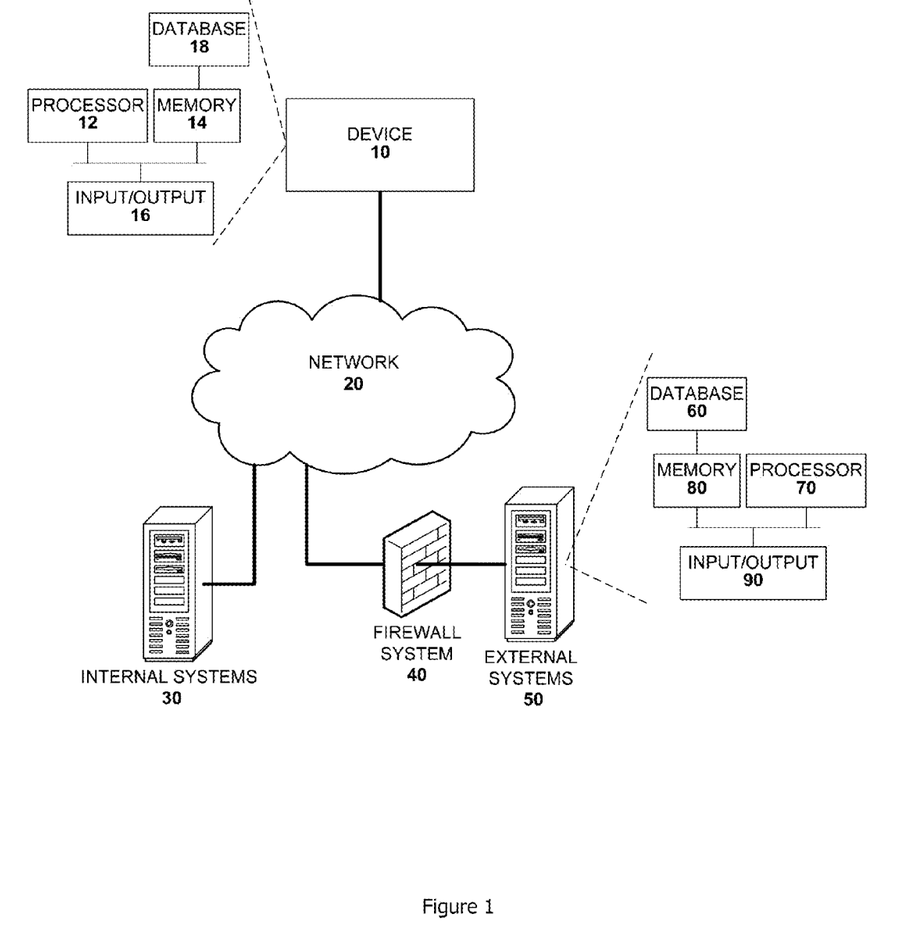
FIG. 1 is a diagram of an architecture of the system for retrieving business objects from a backend system according to an embodiment.

FIG. 1 illustrates an architecture of the system for retrieving business objects from a backend system according to an embodiment. In an embodiment, device 10 may be a handheld device, personal digital assistant (PDA), television set-top Internet appliance, mobile telephone, smart phone, tablet, Android™ device, iPod™, iPhone™, iPad™, Windows™ based device, etc., or as a combination of one or more thereof, or other comparable device. A mobile application, such as for example, a calendar application, may be executed on device 10. This mobile application may be displayed in a user interface that is displayed on a screen of the device 10.

The calendar entries in the application may be updated by connecting the device 10 to backend computer systems or networks to retrieve new or updated business objects. The business objects may be stored as metadata in one or more databases in the backend system. When the business objects are retrieved, the objects may be translated to a data protocol by a gateway that may be part of a firewall system 40. Device 10 may connect to a gateway through a platform that provides a secured connection for connectivity.

The backend systems storing the business objects may be separated into internal backend systems and external backend systems. Device 10 may connect to internal backend systems 30 through a network 20. Device 10 may also connect to external backend systems 50 through the network 20 and a firewall system 40. The firewall system 40 may include a gateway and a platform such as, for example, Sybase™, to translate the business objects to a data protocol and provide a secured connection.

The existing internal backend systems 30 may include a server and may provide business data, including the business objects. The external backend systems 50 may include a server and may be maintained by a third party, such as an information service provider, and may contain business data, including the business objects, that may be updated by the third party on a periodic basis. The application on device 10 may interact with these external systems to obtain updates and new business objects, through a firewall system 40 separating the internal systems from the external systems. The gateway and platform provided by the firewall system 40 allow for a secure transmission of the business objects and other data to device 10. In an embodiment, the functionality provided by the internal backend systems 30 and external backend systems 50 may be provided by the system running the application to retrieve business objects as well as analytics associated with the business objects.

Device 10 may include a processor 12, a memory 14, and input/output interface 16, and a database 18. Database 18 may include any type of data storage adapted to searching and retrieval. The database 18 may include any SAP specific database such as HANA, which may be an in-memory database, or other database systems. Memory 14 may have a designated storage capacity that may allow for the storage of the business object attributes and corresponding analytics of the business objects, when a local save function is enable. When a user accesses the locally saved business data, processor 12 may retrieve the data from memory 14. In an embodiment, memory 14 may contain different components for retrieving, presenting, changing, and saving the local data. Memory 14 may include a variety of memory devices, for example, Dynamic Random Access Memory (DRAM), Static RAM (SRAM), flash memory, cache memory, and other memory devices. In an embodiment, memory 14 may be a memory device that may be easily incorporated in a mobile device.

The backend systems 30 and 50 may both contain a processor 70, memory 80, a database 60, and an input/output interface 90, all of which may be interconnected via a system bus. In various embodiments, both of the systems 30 and 50 may have an architecture with modular hardware or software systems that include additional systems communicating through one or more networks. The modular design may enable a business to add, exchange, and upgrade systems, including using systems from different vendors in some embodiments. The architecture may include embodiments that have different configurations than the example embodiment depicted in FIG. 1.

In an embodiment, memory 80 may contain different components for retrieving, presenting, changing, and saving data. Memory 80 may include a variety of memory devices, for example, Dynamic Random Access Memory (DRAM), Static RAM (SRAM), flash memory, cache memory, and other memory devices. Additionally, for example, memory 80 and processor 70 may be distributed across several different computers that collectively comprise a system.

Database 60 may include any type of data storage adapted to searching and retrieval. The database 60 may include any specific database such as HANA, which may be an in-memory database, or other database systems such as Informix™, Oracle™, DB2™, or Sybase™. The databases of internal backend systems 30 and external backend system 50 may store business objects for retrieval by the application executed on device 10.

Processor 70 may perform computation and control functions of a system and comprises a suitable central processing unit. Processor 70 may comprise a single integrated circuit, such as a microprocessor, or may comprise any suitable number of integrated circuit devices or circuit boards working in cooperation to accomplish the functions of a processor. Processor 70 may execute computer programs, such as object-oriented computer programs, within memory 80.

The business objects for the calendar application may be retrieved from the databases 60 of the internal backend systems 30 and the external backend systems 50 and rendered to predefined categories to enable the calendar application to be configured into different business contexts.

Figure 2:
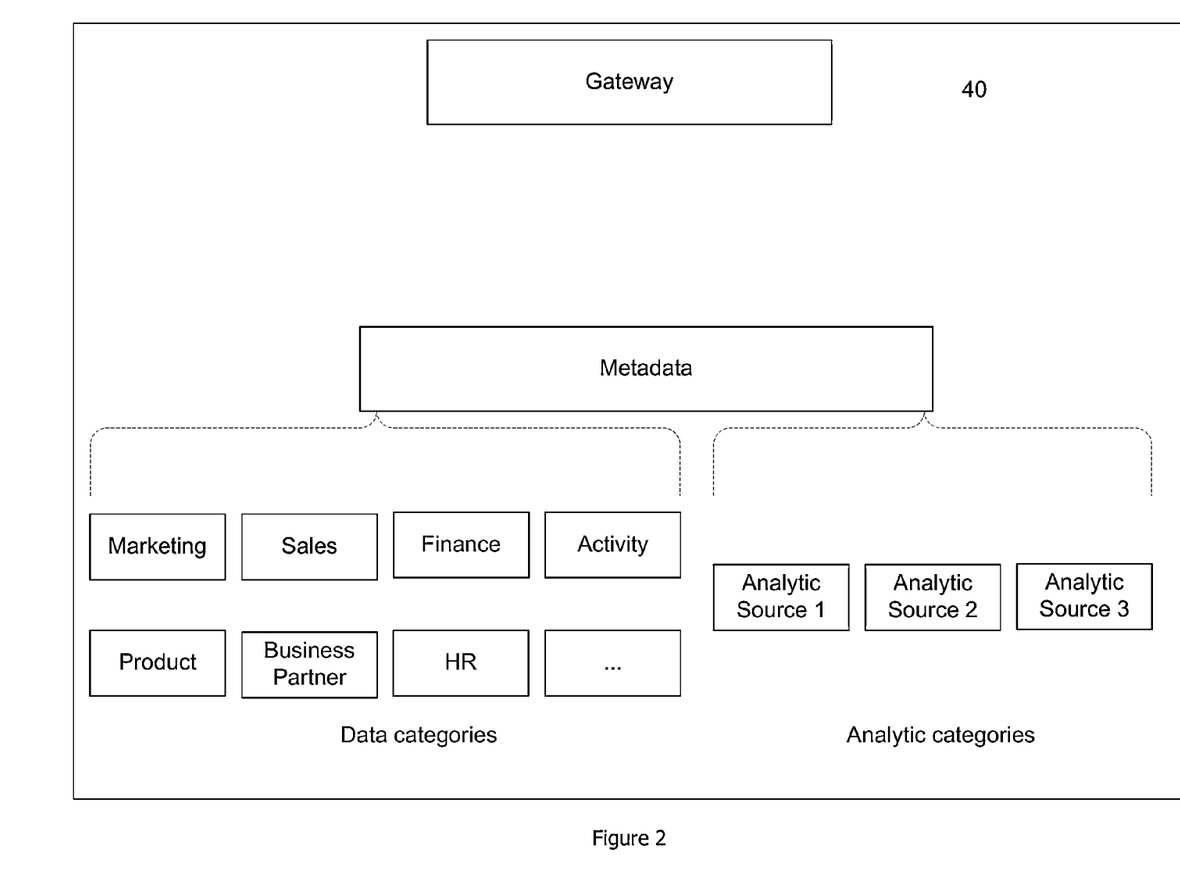
FIG. 2 is a diagram of an architecture for categorizing business objects retrieved from the backend systems according to an embodiment.

FIG. 2 illustrates an architecture for categorizing business objects retrieved from the backend systems according to an embodiment. Device 10 may connect through a network 20 to an internal backend system 30 or an external backend system 50, through, for example a Sybase Unwired Platform™ in a firewall system 40. The platform may provide administrative functions such as providing security keys that may enable the connection to external back end system 50 through a business gateway.

The business objects may represent a modeling of a particular business process of the enterprise resource planning software system. The business objects may be stored on a database in internal backend system 30 or external backend system 50. In an embodiment where there is an internal backend system, the business objects corresponding to the business processes may also be stored in a database of the internal backend system 30 in addition to the external backend system 50. In an alternate embodiment, there may be no internal backend system, and the system may only include a single backend system, external backend system 50. In this embodiment, the business objects corresponding to the business processes may be stored in a database of the external backend system 50. When business objects are retrieved from database 60 of the external backend system 50, a gateway may transform the internal data protocol into a necessary data format for transmission by way of a platform.

The backend data of the business objects may be categorized into categories representing data categories or analytic categories. In an example embodiment, business objects that corresponds to specific data categories may be rendered to customized categories. Examples of customized data categories may include but is not restricted to, "Marketing", "Sales", "Finance", "Activity", "Product", "Business Partner", "HR", etc. The retrieved data may be separated into any one of the customized categories. For example, if the backend data of a business object indicates that the business object may correspond to advertising information, the business object may be categorized in the "Marketing" category. In another example, if the backend data of a business object indicates that the business object corresponds to a specific product, the business object may be categorized in the "Product" category.

In another embodiment, metadata that provides specific analytic information about a business object may be rendered to specific customized analytic categories. Examples of customized analytic categories may include data coming from various analytic sources that may correlate to, but is not restricted to, "Business Intelligence", "HANA™", and "Business Object™". This backend data may provide information pertaining to the analytics of the business object and the business object may be separated into one of the customized categories.

Using the backend data to render the business objects from customized categories may allow for the enablement of the dynamic control of the business objects in a chart in the calendar application. In an embodiment, each business object may have different actions, behavior, data, or analytics assigned to them at runtime based on the categorization of the business objects. In an embodiment, particular actions may be assigned specifically to each category. For example, business objects assigned to the "Sales" category may have particular actions assigned to which may be enabled from control of a visual representation of the business object in a timeline interface or chart in the calendar application during runtime. In an embodiment, the actions assigned to the "Sales" category may be unique and differ from, for example, actions that may be assigned to the "Marketing" category. Assigned actions for the categories may include for example, grouping or ungrouping the visual representations of the business objects in the timeline interface, displaying a detail window for the business object, displaying an analytic chart for the business object, setting a status for a business object, etc. These actions may be performed dynamically, upon the initiation of a user action, during runtime of the calendar application.

Figure 3:
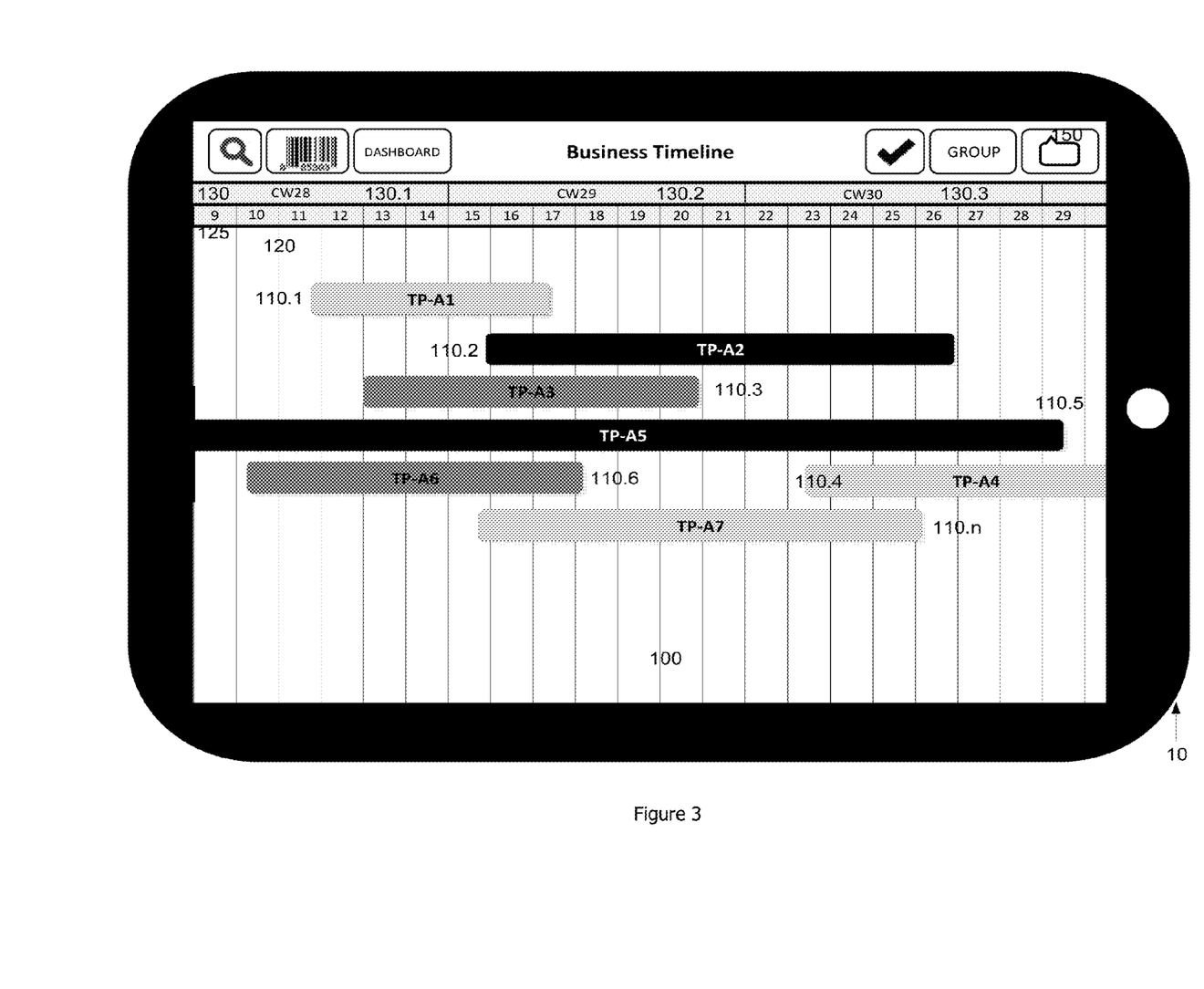
FIG. 3 is a diagram of a graphical user interface that displays the business objects retrieved dynamically at runtime in a Gantt chart on a device according to an embodiment.

FIG. 3 illustrates a graphical user interface 100 that displays the retrieved business objects in a Gantt chart dynamically at runtime on device 10 according to an embodiment. Visual representations of the categorized business objects may be dynamically created for display in the calendar application. Visual representations associated with the business objects may be displayed in a chart such as a Gantt chart, on the user interface 100 of device 10 as visual bars.

Each visual bar may present information about a dynamically rendered business object in the user interface 100. In the example embodiment of FIG. 3, visual bars 110.1-110.$n$ may be displayed on user interface 100. The number of visual bars may correspond to the number of business objects, as each visual bar may map to a specific business object of the business enterprise software.

The information in visual bars 110.1-110.$n$ may represent business objects of the business enterprise software. The business objects being displayed in visual bars 110.1-110.$n$ may represent a modeling of a particular business process. In an example embodiment, the visual bars 110.1-110.$n$ may correspond to information related to products, business promotions, sales orders, sales quotes, customer quotes, service documents, business opportunities, etc. Each of the business objects and objects represented by a corresponding visual bar may include attributes defined from backend customizing and associated to the business object. Attributes may include, for example, a specified time period, a specified product, customer information, product information, etc. In an example embodiment where the business object corresponds to a business promotion, attributes of the business object may include the promotion period of the promotion, including a start and end date, the companies offering the promotion and the companies being offered the promotion, and the product for which the promotion applies, including information pertaining to the product.

The attributes of business objects displayed user interface 100 may indicate a range of values. For example, in an embodiment where the business objects correspond to business promotions, each of the business objects in visual bars 110.1-110.$n$ may include one or more attributes indicating the time period for which the business promotion is valid. The time period may be implemented by either defining a single time period attribute associated with the business object or by defining a start date attribute and an end date attribute associated with the business object. In an alternate embodiment, the business object may include one or more attributes indicating a range of quantities to which the business promotion applies to.

The size of the visual bars 110.1-110.$n$ in user interface 100 may be increased or decreased relative based on a selection by a user of the displayed time interval scales of the calendar application. In an embodiment, multiple displayed time interval ranges 125 and 130.1-130.2 may be displayed in user interface 100. The displayed time intervals may represent a range of values associated with at least one business object attribute. The visual bars may be positioned in the calendar application relative to the size of the displayed time intervals of the horizontal axis. In an embodiment, a first selection for a time interval scale may be made for displayed range 125. In the example embodiment in FIG. 3, range 125 may be selected to correspond to a daily time period. In this embodiment, the entries in time range 125 may correspond to subsequent days in the overall business timeline of the application. In alternate embodiments, the time interval scale for range 125 may be selected to correspond to a weekly, monthly, bi-monthly, quarterly, bi-annually, or annual scale.

Similarly, a selection may be made for the time interval scale for displayed range 130. In the example embodiment in FIG. 5, range 130 may be selected to correspond to a weekly time period. In this embodiment, the entries in time range 130 may correspond to subsequent weeks in the overall business timeline of the application. Each entry 130.1-130.3 in range 130 may map to range 125. For example, in the example embodiment of FIG. 3, days 15 to 21 in range 125 may correspond to calendar week 29 of entry 130.2. In alternate embodiments, the time interval scale for range 130 may be selected to correspond to a monthly, bi-monthly, quarterly, bi-annually, annual, or period of multiple years.

The size of visual bars 110.1-110.$n$ may change dependent on the selection of the time interval scales for ranges 125 and 130. In an embodiment where range 125 is selected to correspond to a daily time period, visual bars 110.1-110.$n$ may increase in size. In an embodiment where range 125 is selected to correspond to a weekly, monthly, bi-monthly, quarterly, bi-annually, or annual scale, the size of visual bars 110.1-110.*n* may decrease. The size of visual bars 110.1-110.*n* may decrease as larger time periods are selected.

The visual bars 110.1-110.*n* rendered in the user interface may be positioned relative to the displayed time intervals. The business objects associated with each visual representation and associated detail box may include business object information in common with other business objects that are also visualized in the user interface 100.

Figure 4:
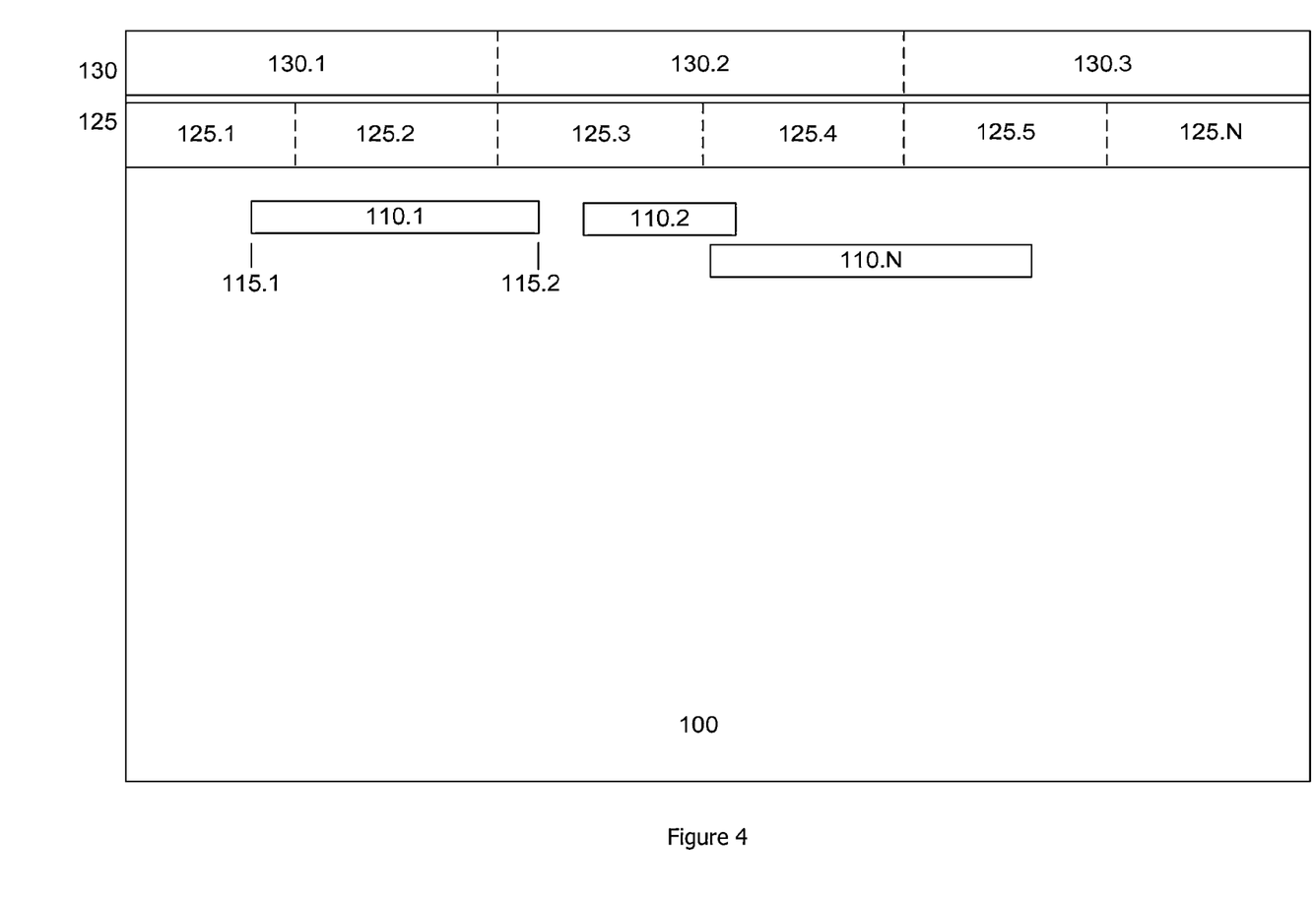
FIG. 4 is a diagram of a layout of the user interface displaying business objects rendered dynamically at runtime on a device according to an embodiment.

FIG. 4 further illustrates the layout of the user interface 100 displaying business objects rendered dynamically at runtime on device 10 according to an embodiment. In an embodiment, the business objects may be displayed in a chart, such as a Gantt chart, in user interface 100 in an organized manner to visually convey information about the business objects. The business objects may be dynamically displayed as visual bars 110.1-110.*n* on the user interface 100 based on the backend customizing made in the embodiment in FIG. 2.

Visual bars 110.1-110.*n* may be visually displayed on the user interface 100 based on the selection of the display time intervals scales for ranges 125 and 130. In an example embodiment, displayed time ranges 125 and 130 may represent time periods. Displayed time range 125 may be divided into units 125.1-125.*n* that may correspond to a specified time period, such as, for example, a daily time period. In other embodiments, time range 125 may be divided into time periods based on a monthly, quarterly, annual basis, or any other scaling representation that may not be restrictive to time. Displayed time range 130 may be divided into units 130.1, 130.2, and 130.3, as in the example embodiment of FIG. 4, that may correspond to a specified time period. The time period for range 130 may correspond to a range that is bigger than the selected time period for range 125. For example, if range 125 is divided into daily time periods, range 130 may be selected to correspond to monthly time periods. In an alternate embodiment where the selected time intervals for range 130 has been selected to be calendar years, the intervals for range 125 may be selected, for example, to correspond to business quarters.

In the example embodiment in FIG. 4, range 125 may be displayed in the user interface 100 above the visual bars. Range 130 may be displayed directly above range 125 in the user interface 100.

In an embodiment, the visual bars 110.1-110.*n* displayed on the user interface 100 may be positioned and presented based on respective attribute values of the business objects relative to the selected time interval scales of ranges 125 and 130. Each visual bar 110.1-110.*n* may include attributes indicating, for example, the business promotion period of the respective business promotion business object. The visual bars 110.1-110.*n* may be presented to visually convey the span of the business promotion periods, and the start/end of the business promotion periods. Each of the visual bars 110.1-110.*n* may include a start date 115.1 and an end date 115.2 where the visual bar begins and ends in the user interface 100. In an example embodiment where the business objects correspond to a business promotion, start date 115.1 may correspond to the start of a promotion. Conversely, end date 115.2 may correspond to the end of a promotion.

The size of the visual bars 110.1-110.*n* as displayed in user interface 100 may depend on the selected time intervals in ranges 125 and 130. As the time intervals scales of the ranges 125 and 130 are selectively increased or decreased by a user, the size of the visual bars may change based on the selection.

User interface 100 may also display visual bars that correspond to other time periods in ranges 125 and 130. For example, user interface 100 may display business promotions in the current year, with the visual representation displayed in interface 100 determined by selection of ranges 125 and 130. A user may however, desire to view previous promotions in a previous year, for example, or future promotions is a subsequent year. In an example embodiment, a user may scroll to a previous time period to view previous promotions by scrolling to the left using his or her finger where device 10 has a touch screen, or a mouse, a keyboard, a keypad, a trackball, etc., for other devices. The displayed time interval units 125.1-125.*n* may display new time periods corresponding to the previously selected year, incremented by the selected time interval scale for range 125. Displayed time interval units 130.1-130.3 may also display new time periods corresponding to the previously selected year, incremented by the selected time interval scale for range 130.

In an alternate embodiment, a user may scroll through the Gantt chart to a future time period to view any planned future business promotions. The user may scroll to the right by using his or her finger where device 10 has a touch screen, or a mouse, a keyboard, a keypad, a trackball, etc., for other devices. The displayed time interval units 125.1-125.*n* may display new time periods corresponding to the future time period, incremented by the selected time interval scale for range 125. Displayed time interval units 130.1-130.3 may also display new time periods corresponding to the future time period, incremented by the selected time interval scale for range 130.

Figure 5:
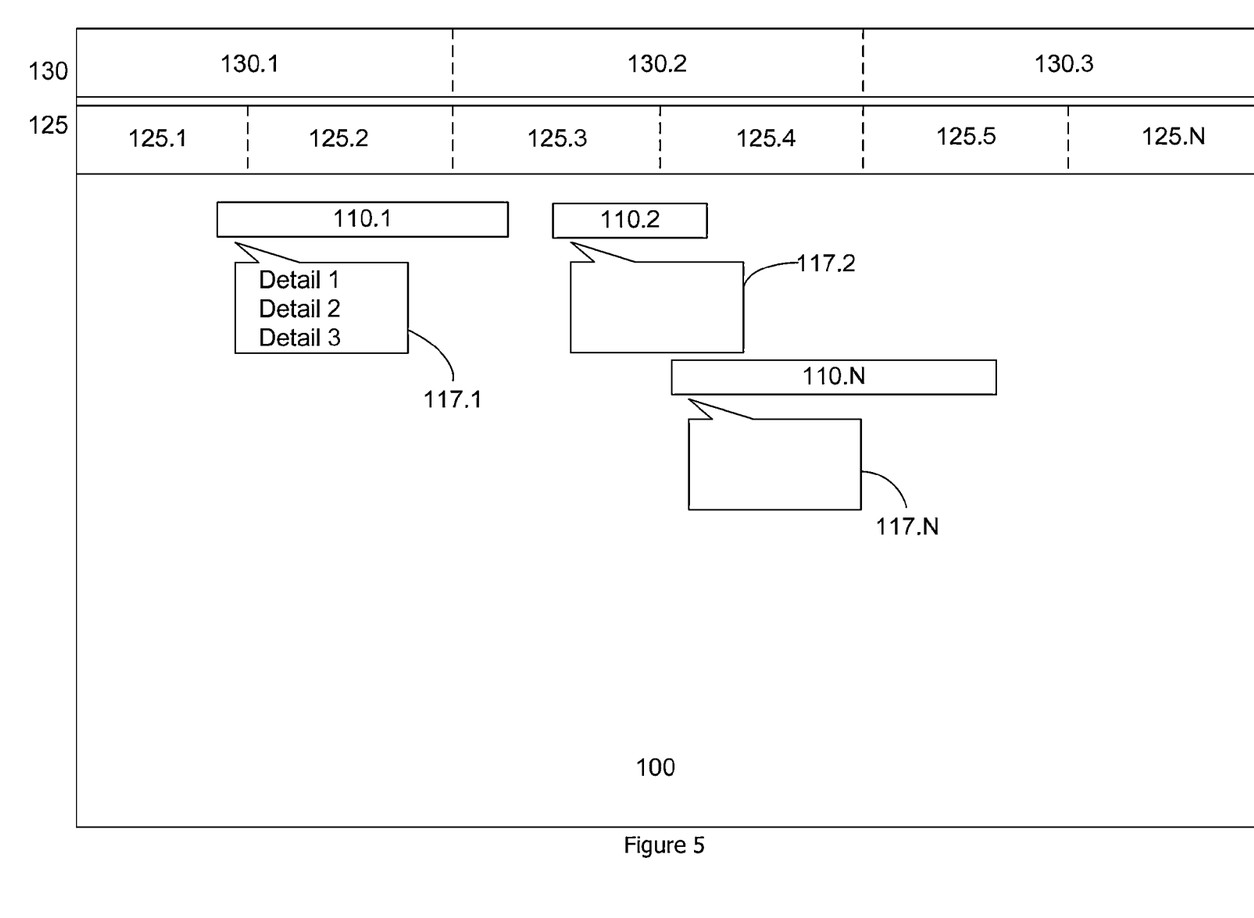
FIG. 5 is a diagram of the user interface displaying business objects alongside detail boxes containing business object information rendered dynamically at runtime on a device according to an embodiment.

FIG. 5 illustrates the user interface 100 displaying business objects alongside detail boxes containing business object attribute information rendered dynamically at runtime on device 10 according to an embodiment. In an embodiment, the business objects may be displayed in a Gantt chart on user interface 100 in an organized manner to visually convey information about the business objects. The business objects may be displayed in visual bars 110.1-110.*n* on the user interface 100.

Visual bars 110.1-110.*n* may be visually displayed on the user interface 100 based on the selection of the display time intervals scales for ranges 125 and 130 which may be divided into units 125.1-125.*n* and 130.1-130.3 that correspond to a specified time period. As in the example embodiment in FIG. 4, visual bars 110.1-110.*n* displayed on the user interface 100 may be positioned and presented based on respective attribute values of the business objects relative to the selected time interval scales of ranges 125 and 130, with the size of the visual bars dependent on the selected time intervals.

Each visual bar 110.1-110.*n* may include attributes indicating, for example, the business promotion period of the respective business promotion business object. Details about the business object attributes may be displayed in detail boxes 117.1-117.*n*. In the example embodiment of FIG. 5, detail box 117.1 may correspond to information about the business object attributes in visual bar 110.1. Similarly, detail box 117.2 may correspond to information about the business object attributes in visual bar 110.2, and detail box 117.*n* may correspond to information about the business object attributes in visual bar 110.*n*. In an embodiment, the number of detail boxes displayed in user interface 100 may be equal to the number of visual bars displayed in user interface 100. The number of detail boxes may also correspond to the number of business objects.

In an embodiment, the detail boxes 117.1-117.*n* may be displayed in the user interface 100 only after the detail boxes have been enabled for display. For example, in this embodiment, detail boxes 117.1, 117.2, and 117.3 may only be displayed if the display is enabled using a toggle button, such as, for example, button 150. All remaining detail boxes, including 117.*n*, may only be displayed, if the display of the detail boxes has been enabled. The application may also be configured to disable the display of the detail boxes through the selection of button 150. In an embodiment where the detail boxes 117.1-117.*n* are displayed concurrently with visual bars 110.1-110.*n*, disabling the display of the detail boxes may remove the detail boxes 117.1-117.*n* from the user interface 100.

A user may selectively scroll through the application to view the visual bars and corresponding detail boxes for past and future time periods. This may be accomplished by scrolling left or right with a user's finger on a touch screen, or scrolling left or right on a mouse, trackball, keypad, keyboard, etc. In an example embodiment, a user may scroll to a previous time period to view previous promotions by scrolling to the left using his or her finger where device 10 has a touch screen, or a mouse, keyboard, keypad, trackball, etc., for other devices. The displayed time interval units 125.1-125.*n* may display new time periods corresponding to the previously selected year, incremented by the selected time interval scale for range 125. Displayed time interval units 130.1-130.3 may also display new time periods corresponding to the previously selected year, incremented by the selected time interval scale for range 130. User interface 100 may display the corresponding visual bars and detail boxes for promotions that occurred in a selectively viewed previous time period.

A user may also selectively scroll through the application to view future time periods. The user may scroll to the right by using his or her finger where device 10 has a touch screen, or a mouse, keyboard, keypad, trackball, etc., for other devices. The displayed time interval units 125.1-125.*n* may display new time periods corresponding to the future selected time period, incremented by the selected time interval scale for range 125. Displayed time interval units 130.1-130.3 may also display new time periods corresponding to the future selected time period, incremented by the selected time interval scale for range 130. User interface 100 may display the corresponding visual bars and detail boxes for promotions that occurred in a selectively viewed future time period.

Figure 6:
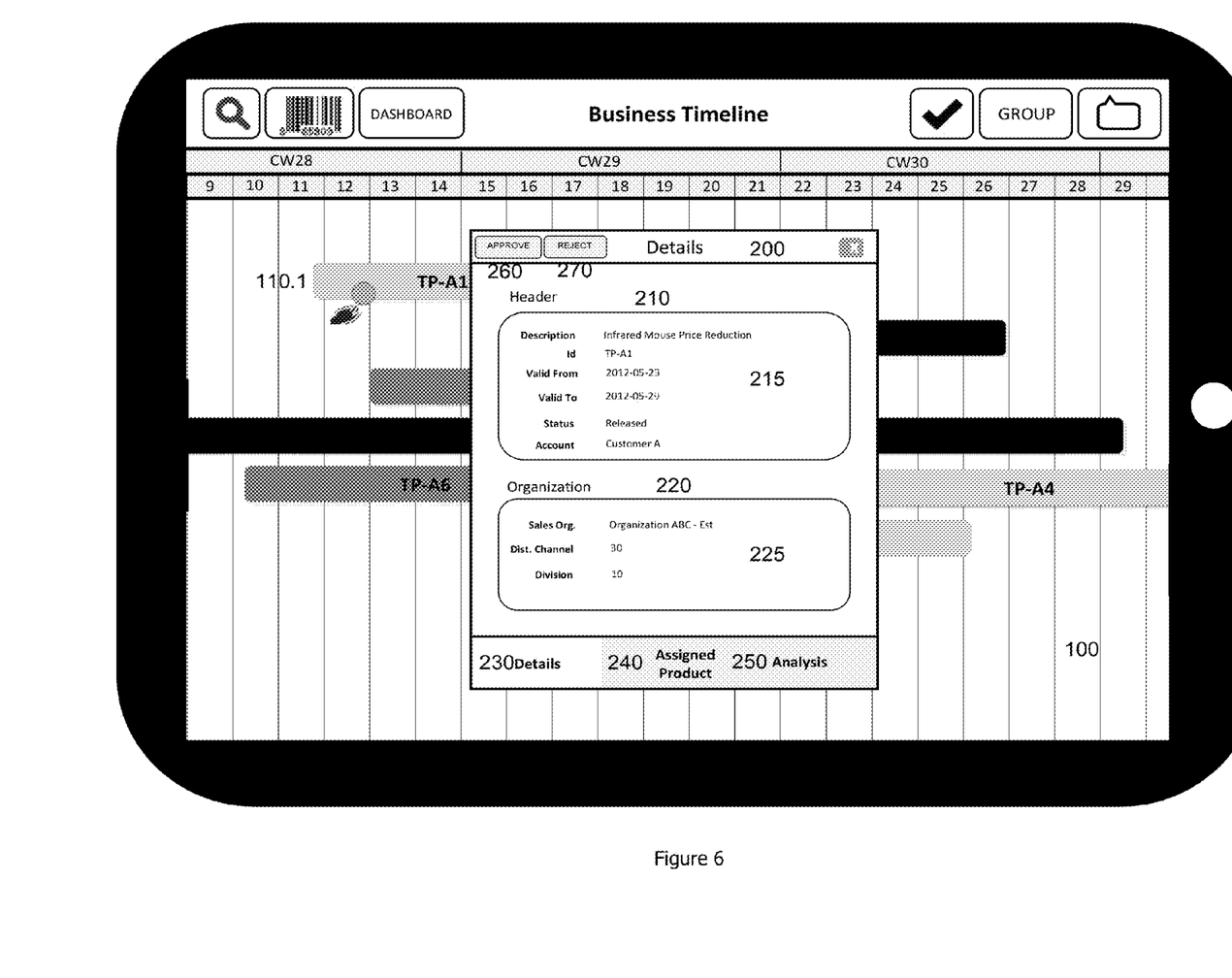
FIG. 6 is a diagram of a graphical user interface that displays the result of a dynamic action at runtime in a Gantt chart on a device according to an embodiment.

FIG. 6 illustrates the result of an executed action assigned dynamically to a Gantt chart control in the user interface of the calendar application according to an embodiment. Visual bars 110.1-110.*n* displayed in a chart in the calendar application on the user interface 100 may correspond to business objects that have been categorized in accordance with the process embodied in FIG. 2. Visual bars 110.1-110.*n* may represent clickable action buttons that trigger predetermined actions based on the categorization of the corresponding business object of the visual bar. In an embodiment, during runtime, the predetermined actions may be assigned to the business objects based on the categorization of the business objects. Predetermined actions may be unique and differ between categories, but may include, for example, grouping or ungrouping the visual representations of the business objects in the timeline interface, displaying a detail window for the business object, displaying an analytic chart for the business object, setting a status for a business object, etc.

A user may initiate an assigned predetermining action to the business object by, for example, selecting the corresponding visual bar 110.1-110.*n*. Selection of the corresponding visual bar may trigger one of a plurality of actions for the specific category for the business object. In an embodiment where device 10 has a touch screen, selection of a visual bar may be made by a gesture that may be made, for example, through the use of a user's finger. Example gestures that may be used to select the visual bar, include, but are not restricted to, tapping or pressing the visual bar on the touch screen. Other example gestures may include, but are not restricted to, for example, circling, swiping, pinching, turning the mobile device, and panning the visual bar on the screen of device 10. In embodiments where device 10 does not have a touch screen, selection of the visual bar may be made by clicking the visual bar by way of a mouse, keyboard, keypad, trackball, etc.

In an embodiment, different predetermined actions may be assigned to be triggered based on specific user actions. In an example embodiment, different predetermined actions for each category may be assigned to different pluralities of performed user actions. For example, for a given category of business objects, a single click or tap on a corresponding visual bar of a business object may trigger a first action. In this embodiment, if a user double-clicks or taps twice on the same corresponding visual bar of the same business object, a different action may be triggered. Alternately, if a user clicks three times or taps three times on the same corresponding visual bar of the same business object, another different action may be triggered. In an embodiment, any plurality of user actions, such as clicks or taps, may generate an assigned action.

In embodiments where device 10 does not have a touch screen and selection of the visual bar is made via a mouse, keyboard, keypad, trackball, etc., different predetermined actions may be assigned based on the manner in which the external hardware is used. For example, a specific predetermined action that is assigned to a category may be triggered by left-clicking a corresponding visual bar via a mouse. Alternately, a separate predetermined action that is also assigned to the same category may be triggered by right-clicking a corresponding visual bar via a mouse. In an embodiment, this may be also be implemented in conjunction with the plurality of user actions performed. For example, right-clicking twice on a visual bar may trigger a separate action from left-clicking twice or simply right-clicking once. Conversely, left-clicking twice, for example, on a visual bar may trigger a separate action from right-clicking twice or simply left-clicking once.

In an embodiment where an external keyboard may be used to select a visual bar, each key or combination of keys may be assigned to trigger a unique action for each category of the business objects upon depression of a respective key.

In an embodiment, the different categories in which the business objects may be assigned to, may have unique actions triggered from the other categories. For example, in an embodiment where a user is using a device 10 with a touch screen, if a user taps once on a visual bar 110.1-110.*n* corresponding to a business object categorized in the "Sales" category, this may trigger, for example, the predetermined action for displaying detail information about the business object. If a user taps twice on the same visual bar, this may trigger, for example, the predetermined action for grouping all of the visual bars that were categorized to the "Sales" category. In contrast, if a user taps once on a visual bar 110.1-110.*n* corresponding to a business object categorized in the "Marketing" category, this may trigger, for example, the predetermined action for displaying an analytic chart for the business object. If a user taps twice on the same visual bar, this may trigger, for example, the predetermined action for setting the status for the same business object.

In the example embodiment of FIG. 6, a user may tap the touch screen of device 10 to select visual bar 110.1. The selection single tap of visual bar 110.1 may trigger a predetermined action for the business object of visual bar 110.1. In the example embodiment of FIG. 6, a selection of visual bar 110.1 via a single tap may trigger the action of displaying detail information about the business object represented by visual bar 110.1. In this example embodiment, a window 200 may be generated displaying the detail information about the corresponding business object that may be displayed in a modal view in front of the Gantt chart in the calendar application.

In the example embodiment of FIG. 6, the generated window 200 displayed based the user's action, may provide information corresponding to the selected business object in a "Details" section of window 200. In an embodiment, the window 200 may automatically present the "Details" section in window 200 upon being triggered from the user's action. In another embodiment, a user may navigate to the "Details" section by selecting tab 230. Window 200 may include a first area 210 and a second area 220. In the "Details" section of window 200, the first area 210 may provide information about a business object or other business data including business object attribute values. In an embodiment where the business object is a business promotion, area 210 may provide information about the business promotion. Area 210 may include section field 215 which may provide specific information about the business object. In an embodiment where the business object is a business promotion, section field 215 may include, but is not limited to, section headers such as a description of the promotion, an identification number, a start date of the promotion, an end date of the promotion, a status of the promotion, and any corresponding customer account.

In the "Details" section of window 200, the second area 220 may provide further information about business object and its corresponding business object, specifically the business object attribute values corresponding to the internal sales organization. In an embodiment where the business object is a business promotion, area 220 may provide information about the business promotion. Area 220 may include section field 225 which may provide specific information about the business object. In an embodiment where the business object is a business promotion, section field 225 may include, but is not limited to, section headers such as the internal sales organization performing the promotion, a distribution channel, and a sales division for the promotion.

Window 200 may include tabs 240 and 250 which may have dynamic action(s) assigned to it. Selection of tab 240 may provide a user with further information about a product associated with a specific business production. Selection of tab 250 may display related customized analytics to a specific business object. Selection of tabs 230, 240, and 250 may be made by touching the desired tab with the user's finger, if device 10 has a touch screen, as in the embodiment in FIG. 6, or with other devices that do not have a touch screen, by clicking on the desired tab with a mouse, keyboard, keypad, trackball, etc.

Window 200 may also include buttons 260 and 270 which may have dynamic actions assigned to each button based on the customized category in the backend. Selection of buttons 260 and 270 may be made by touching the desired button with the user's finger, if device 10 has a touch screen, or in other devices, by clicking on the desired tab with a mouse, keyboard, keypad, trackball, etc.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for dynamically controlling business objects in a timeline chart visualized in a calendar application, the method comprising:

retrieving the business objects stored in a backend system;

categorizing the business objects into customized categories;

assigning predefined actions to be performed on the business objects to the customized categories, each category having a unique set of assigned actions;

displaying visual representations of the business objects in the timeline chart on a user interface, wherein each of the business objects is represented by a visual bar and the visual bar is a selectable action button;

upon selection of at least one of the visual bars via the selectable action button, triggering at least one of the predefined actions based on a categorization of the associated business object, the at least one of the predefined actions including grouping the visual representations of the business objects in the timeline chart; and displaying an updated version of the timeline chart based on the triggering of the predefined action;

wherein a first predefined action includes a single tap of the visual bar and responsive to the single tap, displaying detailed information regarding the business object associated with the visual bar; and wherein a second predefined action includes a double tap of the visual bar and responsive to the double tap, grouping the visual representations of the business objects in the chart.

2. The method according to claim 1, wherein the user action includes at least one of touching, tapping, pinching, swiping, pressing, shaking, and circling a touch screen of a device displaying the user interface.

3. The method according to claim 1, wherein the user action includes at least one of clicking a mouse, clicking a trackball, entering an input in a keypad, and entering an input in a keyboard.

4. The method according to claim 1, wherein the chart is a Gantt chart.

5. The method according to claim 1, further comprising:
dynamically assigning the predefined actions to a chart control at runtime based on a business context of the calendar application.

6. The method according to claim 1, wherein different predetermined actions for each category are triggered based on a performed number or type of user interaction.

7. A device having a calendar application stored thereon to dynamically control business objects in a timeline chart visualized in the calendar application, the device comprising:
an arrangement performing the following:
retrieving the business objects stored in a backend system;
categorizing the business objects into customized categories;
assigning predefined actions to be performed on the business objects to the customized categories, each category having a unique set of assigned actions;
displaying visual representations of the business objects in the timeline chart on a user interface, wherein each of the business objects is represented by a visual bar and the visual bar is a selectable action button;
upon selection of at least one of the visual bars via the selectable action button, triggering at least one of the predefined actions based on a categorization of the associated business object, the at least one of the predefined actions including grouping the visual representations of the business objects in the timeline chart; and
displaying an updated version of the timeline chart based on the triggering of the predefined action;
wherein a first predefined action includes a single tap of the visual bar and responsive to the single tap, displaying detailed information regarding the business object associated with the visual bar; and
a second predefined action includes a double tap of the visual bar and responsive to the double tap, grouping the visual representations of the business objects in the chart.

8. The device according to claim 7, wherein the user action includes at least one of touching, tapping, pinching, shaking, and circling a touch screen of the device.

9. The device according to claim 7, wherein the user action includes at least one of clicking a mouse, clicking a trackball, entering an input in a keypad, and entering an input in a keyboard.

10. The device according to claim 7, wherein the chart is a Gantt chart.

11. The device according to claim 7, wherein the predefined actions are dynamically assigned to a chart control at runtime based on a business context of the calendar application.

12. The device according to claim 7, wherein the predefined actions are assigned to the customized categories during runtime.

13. The device according to claim 7, wherein the predefined actions include at least one of: ungrouping the visual representations of the business objects in the chart, displaying an analytic chart for the business object of the selected visual representation, and setting a status for the business object of the selected visual representation.

14. The device according to claim 7, wherein different predetermined actions for each category are triggered based on a performed number or type of user interaction.

15. An apparatus for dynamically controlling business objects in a Gantt chart visualized in timeline interface, the apparatus comprising:
a mobile device; and
a calendar application displayed on a user interface of the mobile device, the calendar application being executed to:
retrieve the business objects stored in a backend system;
categorize the business objects into customized categories;
display visual representations of the business objects in the Gantt chart on the user interface, wherein each of the business objects is represented by a visual bar and the visual bar is a selectable action button;
during runtime, assign predefined actions to be performed on the business objects to the customized categories, each category having a unique set of assigned actions;
during runtime, dynamically assign the predefined actions to a chart control based on a business context of the calendar application;
upon selection of at least one of the visual bars via the selectable action button, trigger at least one of the predefined actions based on a categorization of the associated business object, the at least one of the predefined actions including grouping the visual representations of the business objects in the timeline chart; and
display an updated version of the timeline chart based on the triggering of the predefined action;
wherein different predetermined actions for each category are triggered based on a performed number or type of user interaction;
wherein a first predefined action includes a single tap of the visual bar and responsive to the single tap, displaying detailed information regarding the business object associated with the visual bar; and
wherein a second predefined action includes a double tap of the visual bar and responsive to the double tap, grouping the visual representations of the business objects in the chart.

16. A system for dynamically controlling business objects in a Gantt chart visualized in timeline interface, the system comprising:
at least one backend server storing business objects;
a computer system running software to communicate to a mobile device;
the mobile device executing an application for display on an user interface of the mobile device, the application executed to:
retrieve the business objects from the at least one backend server;
categorize the business objects into customized categories;
display visual representations of the business objects in the Gantt chart on the user interface, wherein each of the business objects is represented by a visual bar and the visual bar is a selectable action button;
during runtime, assign predefined actions to be performed on the business objects to the customized categories, each category having a unique set of assigned actions;
during runtime, dynamically assign the predefined actions to a chart control based on a business context of the calendar application;
upon selection of at least one of the visual bars via the selectable action button, trigger at least one of the predefined actions based on a categorization of the associated business object, the at least one of the predefined actions including grouping the visual representations of the business objects in the timeline chart; and display an updated version of the timeline chart based on the triggering of the predefined action;

wherein different predetermined actions for each category are triggered based on a performed number or type of user interaction;

wherein a first predefined action includes a single tap of the visual bar and responsive to the single tap, displaying detailed information regarding the business object associated with the visual bar; and wherein a second predefined action includes a double tap of the visual bar and responsive to the double tap, grouping the visual representations of the business objects in the chart.

17. The method according to claim 1, wherein the position and sizing of each of the visual bars is determined by attribute of the corresponding business object relative to user-selectable time interval scales of the timeline chart.

18. The method according to claim 1, wherein the customized categories include an analytic source.

19. The method according to claim 1, further comprising:
responsive to the single tap, displaying an analytic chart of the business object associated with the visual bar; and
responsive to the double tap, setting a status for the business object associated with the visual bar.

* * * * *